(12) United States Patent
Johnson et al.

(10) Patent No.: US 6,595,479 B2
(45) Date of Patent: Jul. 22, 2003

(54) ELECTRICAL FIXTURE MOUNTING ASSEMBLY

(75) Inventors: Steven J. Johnson, Galien, MI (US); Richard Swanson, Niles, MI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/854,526

(22) Filed: May 15, 2001

(65) Prior Publication Data

US 2002/0171019 A1 Nov. 21, 2002

(51) Int. Cl.[7] .............................................. B42F 13/00
(52) U.S. Cl. .................. 248/343; 248/200.1; 248/300; 248/346; 248/906; 248/27.1; 174/58; 220/3.9; 403/13; 403/234; 403/237
(58) Field of Search ................................. 248/906, 343, 248/200.1, 229.16, 342, 344, 229.26, 300, 27.1, 346, 57, 506; 174/58; 220/3.9; 403/13, 234, 237, 209, 213

(56) References Cited

U.S. PATENT DOCUMENTS

| 1,798,838 | A | | 3/1931 | Garvin | |
|---|---|---|---|---|---|
| 2,758,810 | A | | 8/1956 | Good | |
| 4,050,603 | A | | 9/1977 | Harris et al. | |
| 4,062,512 | A | | 12/1977 | Arnold | 248/309 |
| 4,390,105 | A | * | 6/1983 | Graves | 220/3.6 |
| 4,463,923 | A | | 8/1984 | Reiker | 248/546 |
| RE33,147 | E | | 1/1990 | Reiker | 248/200 |
| 4,909,405 | A | | 3/1990 | Kerr, Jr. | 220/3.9 |
| 5,044,582 | A | | 9/1991 | Walters | 248/57 |
| 5,072,848 | A | * | 12/1991 | Pipis et al. | 220/241 |
| 5,150,868 | A | | 9/1992 | Kaden | 248/343 |
| 5,242,269 | A | * | 9/1993 | Chang | 416/244 |
| 5,303,894 | A | | 4/1994 | Deschamps et al. | 248/343 |
| 5,349,134 | A | * | 9/1994 | Russell | 174/48 |
| 5,393,026 | A | | 2/1995 | Deschamps et al. | 248/343 |
| 5,610,644 | A | * | 3/1997 | Timm, Jr. et al. | 347/87 |
| 5,619,263 | A | * | 4/1997 | Laughlin et al. | 248/343 |
| 5,624,202 | A | * | 4/1997 | Grierson | 403/327 |
| 5,954,304 | A | | 9/1999 | Jorgensen | 248/200 |
| 6,224,153 | B1 | * | 5/2001 | Vodinh | 297/331 |
| 6,280,263 | B1 | * | 8/2001 | Manor et al. | 439/801 |
| 6,335,486 | B1 | * | 1/2002 | Reiker | 174/51 |

* cited by examiner

*Primary Examiner*—Kimberly Wood
(74) *Attorney, Agent, or Firm*—Marcus R. Mickney; Alfred N. Goodman; Mark S. Bicks

(57) ABSTRACT

An electrical fixture mounting assembly is provided for quickly and easily mounting an electrical fixture to a brace assembly. The electrical fixture mounting assembly includes an electrical box, a brace assembly and a bracket. The brace assembly is mounted between joists located above an aperture in a ceiling. A bracket is snap-fitted onto the brace assembly. Protrusions on the bracket prevent substantial movement of the bracket during installation of the electrical box. Tabs on the bracket engage openings in the electrical box, thereby facilitating alignment of the electrical box with the bracket. An electrical box is secured to the brace assembly by the bracket and fasteners.

20 Claims, 5 Drawing Sheets

ELECTRICAL FIXTURE MOUNTING ASSEMBLY

FIELD OF THE INVENTION

The invention relates to an electrical fixture mounting assembly. More particularly, the invention relates to a mounting bracket for securing an electrical box to a tubular brace. Still more particularly, the invention relates to a mounting bracket having dimples to retain the bracket on the brace and tabs for aligning the electrical box with the bracket.

BACKGROUND OF THE INVENTION

Many electrical fixture mounting assemblies exist for mounting an electrical fixture from a support positioned on the upper surface of a ceiling. Typically, a brace is inserted through an aperture in the ceiling and is mounted between parallel joists that support the ceiling. A bracket is then inserted into the ceiling aperture and positioned onto the brace. An electrical box is then inserted into the ceiling aperture and attached to the lower side of the brace by the bracket and fasteners. The electrical box is now securely mounted to the brace so that it may support an electrical fixture.

One problem with installing existing electrical fixture mounting assemblies is that the bracket is prone to movement while positioning and attaching the box. When bringing an electrical box into contact with the bracket, nothing keeps the bracket from spinning around or moving axially along the brace and out of an installation position. The bracket may even be knocked completely off the brace. Existing mounting assemblies provide no means for preventing the bracket from moving out of position once the bracket has been positioned on the brace.

A second problem with installing existing electrical fixture mounting assemblies is the difficulty involved with aligning and securing the electrical box to the bracket. Since the mounting assembly is installed through a small aperture in the ceiling, workspace is severely limited. An installer must rely more on a sense of touch than sight to actually align the electrical box with the bracket. Existing mounting assemblies provide no means to readily align the electrical box with the bracket for a quick installation. Relying on a sense of touch further compounds the likelihood of moving the bracket out of position so the electrical box cannot be connected to the bracket. These problems make installing an electrical fixture mounting assembly a time consuming and arduous task.

Examples of existing electrical fixture mounting assemblies are disclosed in the following disclosures: U.S. Pat. Nos. 1,798,838 to Garvin; 2,758,810 to Good; 4,050,603 to Harris et al.; 4,062,512 to Arnold; 4,463,923 to Reiker; 4,909,405 to Kerr, Jr.; 5,044,582 to Walters; 5,150,868 to Kaden; 5,303,894 to Deschamps et al.; 5,393,026 to Deschamps et al.; 5,954,304 to Jorgensen; and U.S. Pat. No. Re. 33,147 to Reiker.

Thus, there is a continuing need to provide improved electrical fixture mounting assemblies.

SUMMARY OF THE INVENTION

Accordingly, it is a primary objective of the invention to provide an electrical fixture mounting assembly having a bracket that is prevented from substantially moving during installation.

Another object of the invention is to provide an electrical fixture mounting assembly having a bracket with positioning tabs for quickly and easily aligning an electrical box with the bracket during installation.

Another object of the invention is to provide an electrical fixture mounting assembly that is quickly and easily installed.

The foregoing objects are basically attainable by providing a bracket for an electrical box mounting assembly, comprising a substantially U-shaped portion for receiving a brace and having first and second ends; first and second flanges extending from the first and second ends of the substantially U-shaped portion, respectively; first and second tabs extending from the first and second flanges, respectively, each of the first and second tabs adapted to engage an opening in an electrical box; and a fastener hole in each of the first and second flanges corresponding to an opening in the electrical box for receiving fasteners to secure the electrical box to the bracket.

The foregoing objects are also attained by providing a bracket for an electrical box mounting assembly, comprising a substantially U-shaped portion adapted to receive a brace, the U-shaped portion having an inner surface and an outer surface, first and second legs, and first and second ends; a protrusion on the inner surface of each of the first and second legs of the substantially U-shaped portion for retaining the brace within the bracket; first and second flanges extending from the first and second ends of the substantially U-shaped portion, respectively; and a fastener hole in each of the first and second flanges corresponding to an opening in an electrical box for receiving fasteners to secure the electrical box to the bracket with the brace retained therebetween.

The foregoing objects are also obtained by providing An electrical fixture mounting assembly, comprising an electrical box having an upper wall, the wall having a plurality of openings therein; a brace; a bracket for attaching the electrical box to the brace, the bracket, including a substantially U-shaped portion adapted to receive the brace, the substantially U-shaped portion having an inner and an outer surface and first and second legs; a protrusion on the inner surface of each of the first and second legs of the substantially U-shaped portion for retaining the brace within the bracket; first and second flanges extending from the first and second legs, respectively, each of the flanges having a fastener hole therein corresponding to one of the plurality of openings in the electrical box upper wall; first and second tabs extending from the first and second flanges, respectively, each of the first and second tabs adapted to engage one of the plurality of openings in the electrical box upper wall to align the box and the bracket; and fasteners extending through the plurality of openings in the electrical box into the flange fastener holes to secure the electrical box to the bracket with the brace secured therebetween.

The foregoing objects are also obtained by providing a method of mounting an electrical box to a brace, comprising the steps of inserting an adjustable brace having first and second ends through an opening in a ceiling between first and second joists; adjusting the brace until the first and second brace ends contact the first and second joists creating a tight fit between the brace and the joists; inserting a bracket through the ceiling opening and snap-fitting the bracket onto the brace; inserting an electrical box through the ceiling opening and aligning and engaging the electrical box with the bracket; and inserting fasteners through electrical box fastener holes and through corresponding bracket fastener holes to secure the electrical box to the brace.

Other objects, advantages and salient features of the invention will become apparent from the following detailed description, which, taken in conjunction with the annexed drawings, discloses preferred embodiments of the invention.

DRAWINGS

Referring now to the drawings that form a part of this original disclosure:

DETAILED DESCRIPTION OF THE INVENTION

Figure 1:
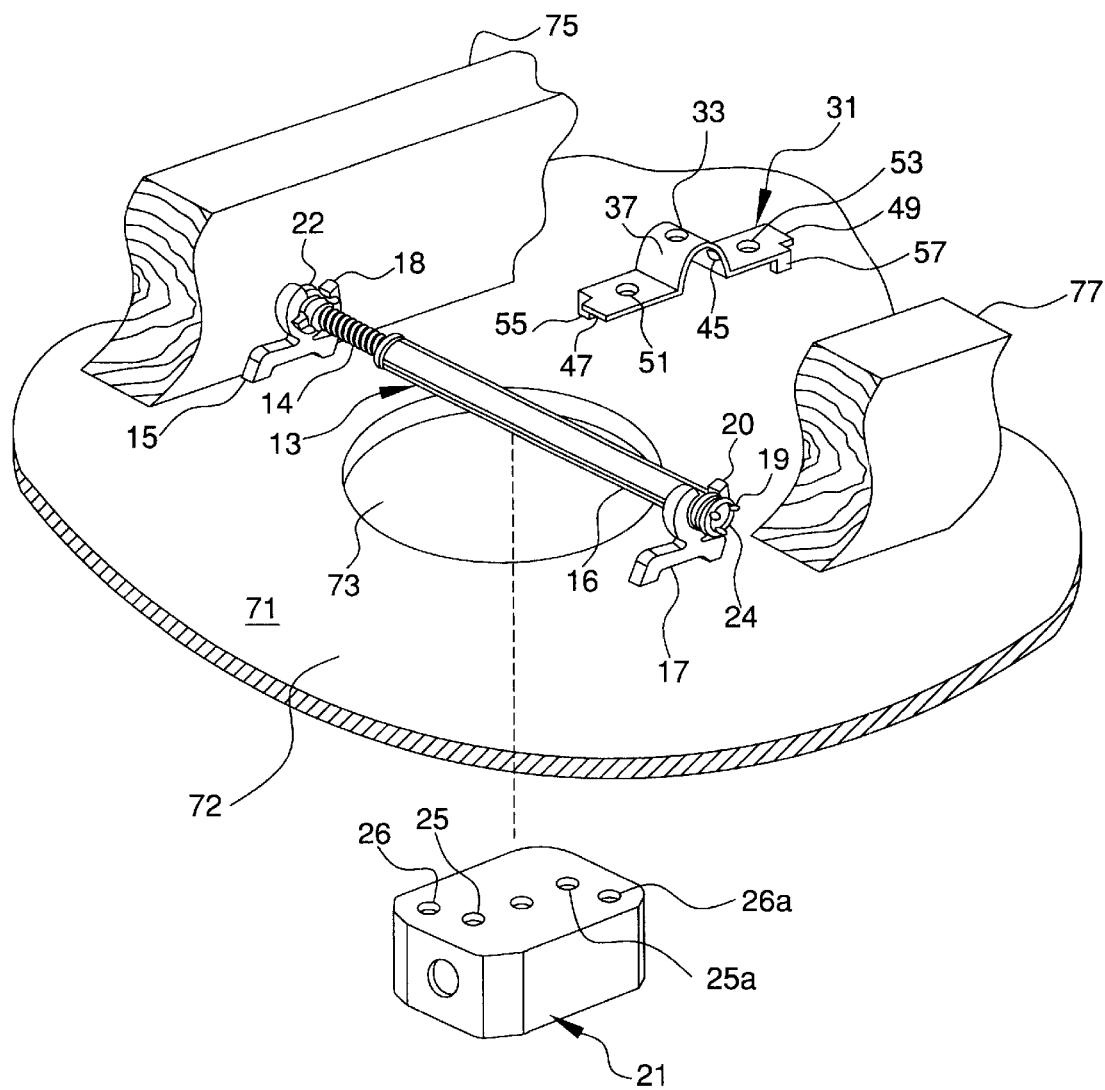
FIG. 1 is a perspective view of a bracket of the present invention, including a brace supported between two joists above a ceiling opening, prior to snap-fitting the bracket onto the brace and a box to be mounted to the bracket.

As shown in FIGS. 1–11, an electrical fixture mounting assembly in accordance with the present invention comprises an electrical box 21, a brace assembly 13 and a bracket 31 for attaching the electrical box to the brace assembly. The bracket 31 has dimples 43 and 45 for creating a snap-fit with the brace assembly 13, thereby preventing substantial movement of the bracket when attaching the electrical box 21 to the bracket. The bracket 31 also has tabs 55 and 57 that correspond to openings 25 and 25a in the electrical box 21, thereby allowing a user to quickly and easily align the electrical box with the bracket when working in a dark and confined area.

As shown in FIG. 1, the adjustable brace assembly 13 is installed between parallel joists 75 and 77 that support a ceiling 71. As shown in FIGS. 1–4 and 11, the brace assembly 13 has an internally threaded tube 16 that receives externally threaded rod 14. A tight fit of the brace assembly 13 between the joists 75 and 77 is obtained by adjusting the amount of the rod 14 that is threaded within the tube 16. This is conventional and is shown in U.S. Pat. No. 4,463,923, entitled "Hanger Assembly", the disclosure of which is hereby incorporated herein by reference. Preferably, the rod 14 and tube 16 have a substantially tubular shape. End fittings 22 and 24 are connected to opposite ends of the rod 14 and tube 16, respectively. Spacing members 15 and 17 of the brace assembly have substantially U-shaped portions 18 and 20, respectively, for receiving end fittings 22 and 24. Prongs 19 extend outwardly from the end fittings 22 and 24 and are adapted to engage the joists 75 and 77.

Figure 2:
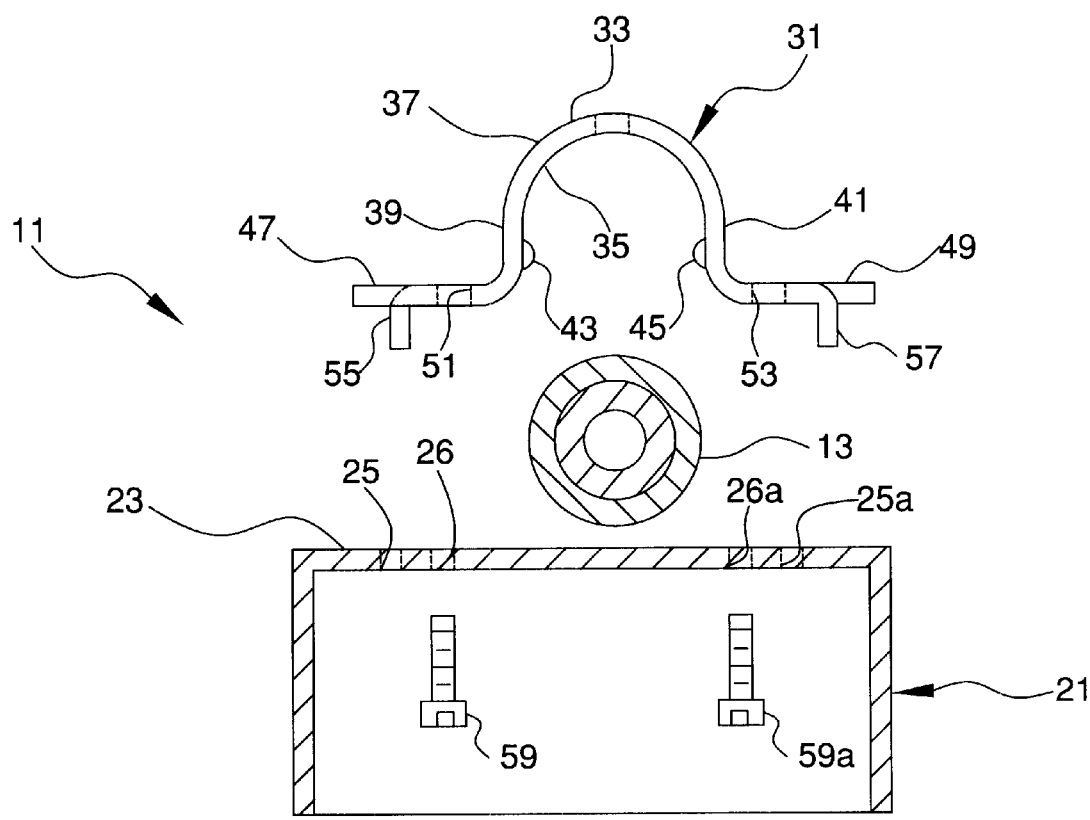
FIG. 2 is an exploded end cross-sectional view of an electrical fixture mounting assembly, including a bracket, brace and electrical box.
Figure 3:
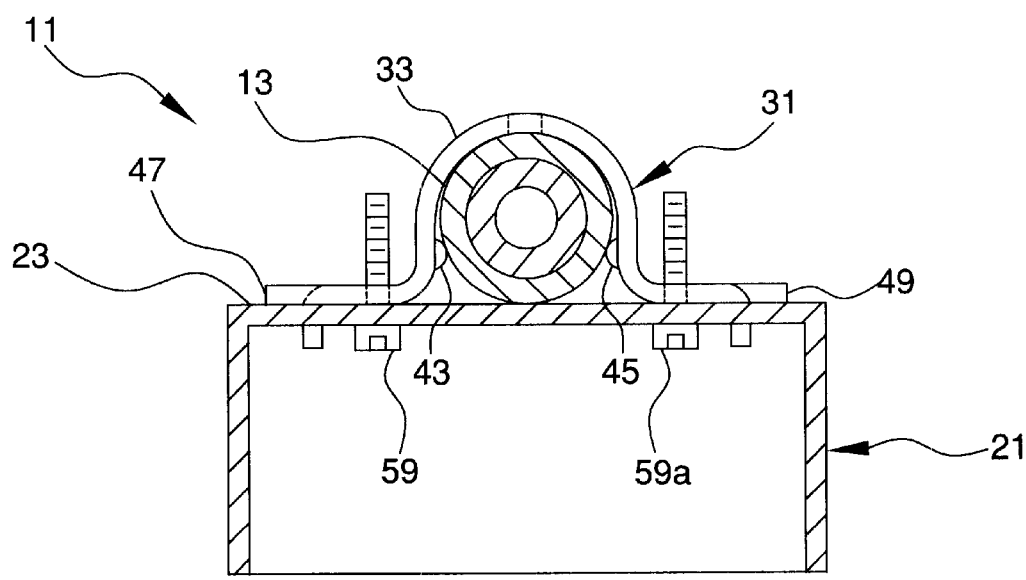
FIG. 3 is an end cross-sectional view of the assembled electrical fixture mounting assembly of FIG. 2.
Figure 4:
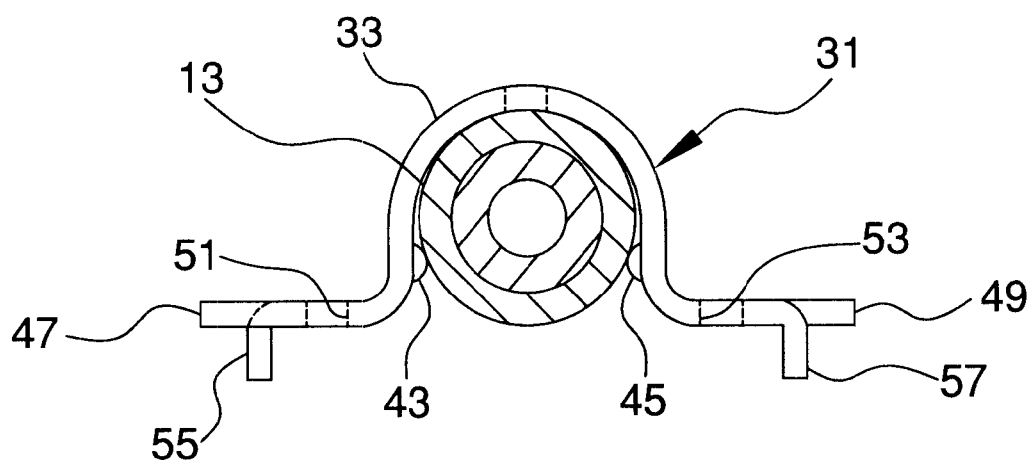
FIG. 4 is an end cross-sectional view of a bracket snap-fitted onto a brace.
Figure 5:
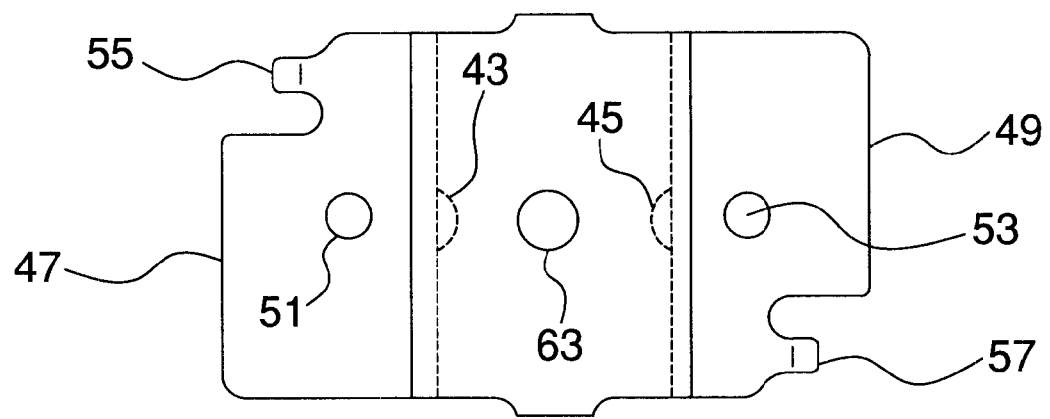
FIG. 5 is a top plan view of a bracket according to the present invention.
Figure 6:
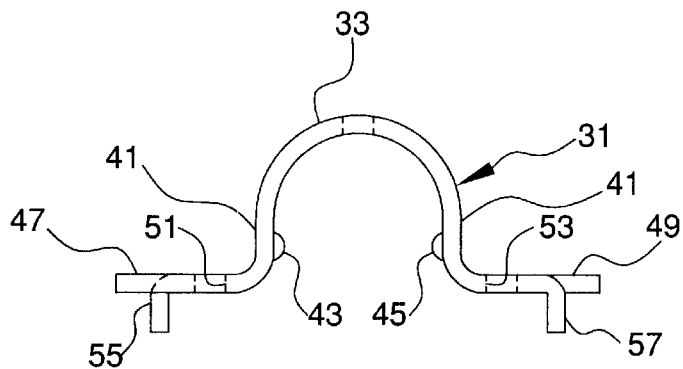
FIG. 6 is an end view of the bracket of FIG. 5.
Figure 10:
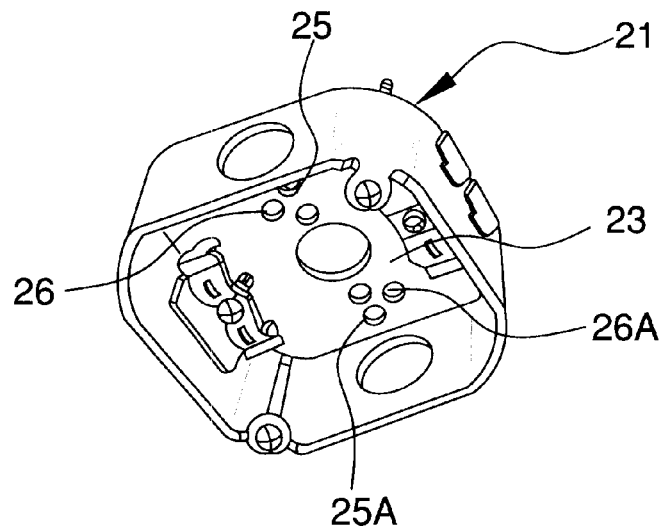
FIG. 10 is a perspective view of a typical electrical box to be used with the present invention.
Figure 11:
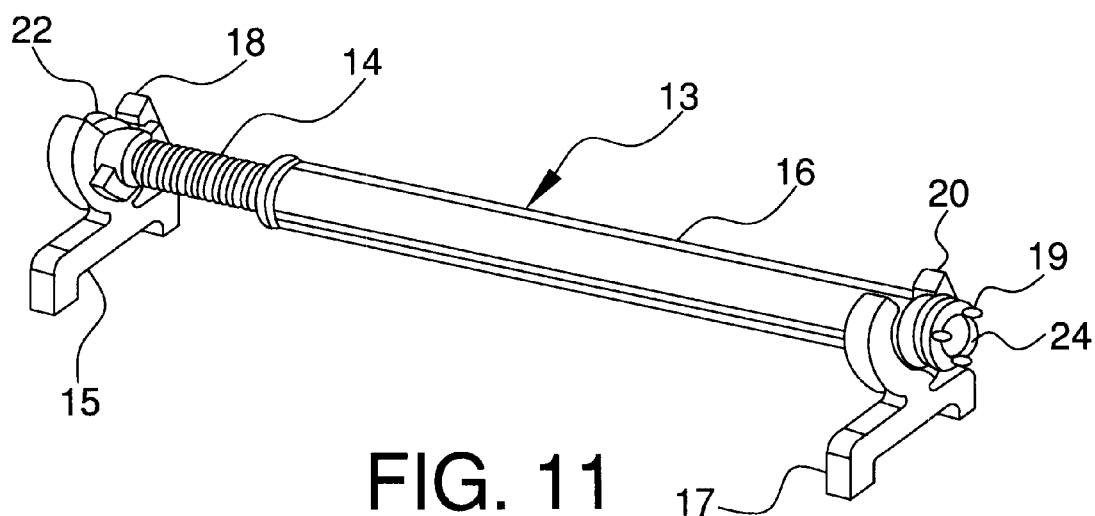
FIG. 11 is a perspective view of a typical brace assembly to be used with the present invention.

An electrical box 21, as shown in FIGS. 2, 3 and 10, is attached to the tube 16 of the brace assembly 13 by the bracket 31. The electrical box 21 has an upper wall 23 that has fastener holes 26 and 26a for receiving fasteners to secure the electrical box to the bracket 31 and openings 25 and 25a adapted to receive tabs 55 and 57 of the bracket. Typically, the electrical box has an octagonal shape, as shown in FIG. 10. The electrical box 21 is adapted to receive and support an electrical fixture once the electrical box 21 has been secured to the brace assembly 13.

The bracket 31, as shown in FIGS. 1–6 and 9, secures the electrical box 21 to the brace assembly 13. The bracket 31 is preferably formed of metal and is resilient. The bracket 31 has a substantially U-shaped portion 33 adapted to receive the tube 16 of the brace assembly 13. The substantially U-shaped portion 33 of the bracket 31 has an inner surface 35 and an outer surface 37. A first flange 47 extends outwardly from a first leg 39 of the substantially U-shaped portion 33. A second flange 49 extends outwardly from a second leg 41 of the substantially U-shaped portion 33.

A first protrusion and a second protrusion on the inner surface 35 of the first and second legs 39 and 41, respectively, of the substantially U-shaped portion 33 of the bracket 31 retain the bracket on the tube 16 of the brace assembly 13. Preferably, the first and second protrusions are first and second dimples 43 and 45, respectively. The distance between the dimples 43 and 45 is less than the diameter of the substantially circular tube 16, thereby creating a snap-fit between the bracket 31 and tube 16.

First and second fastener holes 51 and 53 are located in the first and second flanges 47 and 49, respectively. The fastener holes 51 and 53 correspond to the fastener holes 26 and 26a in the upper wall 23 of the electrical box 21 once the electrical box has been aligned with the bracket 31. Fasteners 59 and 59a are inserted through the electrical box fastener holes 26 and 26a and through the bracket fastener holes 51 and 53 to secure the electrical box to the bracket 31 and, thereby, to the brace assembly 13. Preferably, the first and second bracket fastener holes 51 and 53 are threaded so that nuts are not required on the fasteners. This eliminates the additional awkward task of threading the fasteners through the electrical box and bracket into separate nuts.

Figure 9:
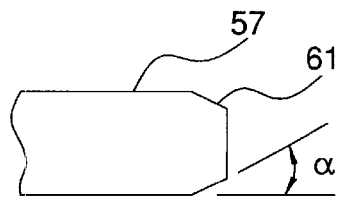
FIG. 9 is an enlarged top view of a chamfered end of a bracket positioning tab of the blank of FIG. 7.

A first tab 55 and a second tab 57 extend downwardly from the first and second flanges 47 and 49, respectively, of the bracket 31. Each of the first and second tabs is adapted to engage one of the openings 25 and 25a in the electrical box upper wall 23, thereby aligning the electrical box 21 with the bracket 31. Preferably, the tabs have chamfered ends 61, as shown in FIG. 9. Preferably, the chamfer angle α is about 30 degrees. The chamfered ends 61 facilitate guiding the tabs 55 and 57 into the electrical box openings 25 and 25a.

Figure 7:
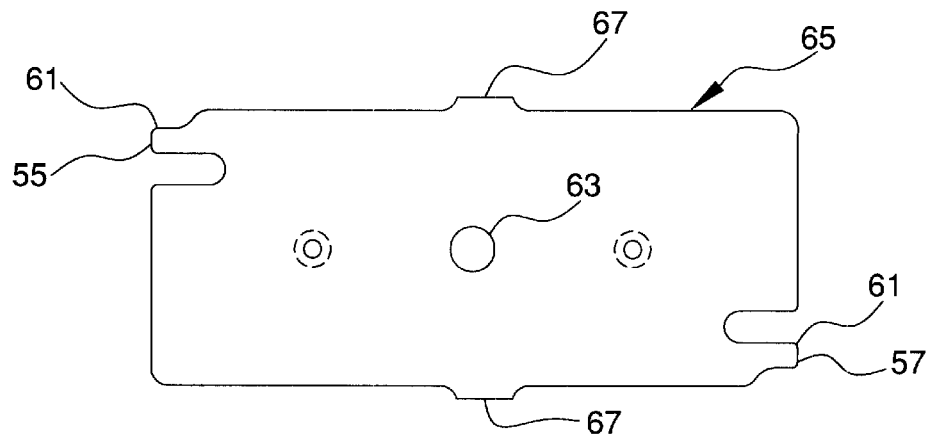
FIG. 7 is a top plan view of a blank used to stamp a bracket according to the present invention.
Figure 8:
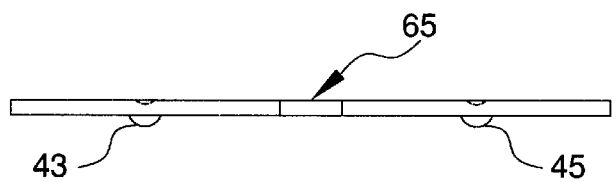
FIG. 8 is a side elevational view of the blank of FIG. 7.

Preferably, a bracket of the present invention is stamped from a blank 65, as shown in FIGS. 7–9, to produce a unitary, one-piece member. Stamping a bracket allows for a quick and easy manufacturing process. Preferably, the brackets are stamped from steel sheets. A pilot hole 63 in the bracket blank 65 is used to accurately locate the progression of the steel sheet as the sheet is fed through a stamping die. The flared edges 67 facilitate removal of the brackets 31 from one another following stamping.

Assembly and Disassembly

As shown in FIG. 1, the amount of available work space to install the electrical fixture mounting assembly is severely limited. An installer has to reach up through the ceiling aperture 73 from below to install the electrical fixture mounting assembly 11 (FIGS. 2 and 3). The electrical fixture mounting assembly of the present invention is quick and easy to install despite the confined work space available to install such an assembly.

As seen in FIG. 1, the brace assembly 13 is inserted through an aperture 73 in the ceiling 71. The support members 15 and 17 are positioned on the upper surface 72 of the ceiling 71 between parallel joists 75 and 77. The rod 14 and tube 16 are adjusted, by threading or unthreading one from the other, until the prongs 19 on the end fittings 22 and 24 engage the joists 75 and 77, thereby creating a tight fit between the brace assembly 13 and the joists.

The bracket 31 is then inserted through the aperture 73 and snap-fit onto the tube 16 of the brace assembly 13. Dimples 43 and 45 on the inner surface 35 of the substantially U-shaped portion 33 of the bracket 31 slide down the tube as the U-shaped portion resiliently expands outwardly. Once the dimples pass the largest width of the tube, the dimples snap back towards one another due to the resiliency of the bracket 31. With the dimples 43 and 45 engaging the tube 16 tightly, substantial movement of the bracket 31 relative to the brace 13 during the rest of the installation is prevented. The dimples 43 and 45 prevent the bracket 31 from slipping, spinning around the tube, moving axially along the tube, or otherwise being accidentally knocked out of position or off of the tube when attempting to align the electrical box with the bracket.

The electrical box 21 is then inserted through the ceiling aperture, and the electrical box openings 25 and 25a are aligned with the first and second tabs 55 and 57 of the bracket 31. Preferably, the ends of the tabs are chamfered to facilitate guiding the tabs into the electrical box openings. Once the electrical box 21 has been positioned such that the openings 25 and 25a have received the bracket tabs 55 and 57, the bracket fastener holes 51 and 53 are aligned with the electrical box fastener holes 26 and 26a. Fasteners 59 and 59a are then inserted from below through the electrical box fastener holes 26 and 26a and threaded into the bracket fastener holes 51 and 53.

Once the electrical box 21 has been secured to the brace assembly 13 by the bracket 31, an electrical fixture (not shown), such as a ceiling fan or a lighting fixture, may be attached to the electrical box.

While advantageous embodiments have been chosen to illustrate the invention, it will be understood by those skilled in the art that various changes and modifications may be made therein without departing from the scope of the invention as defined in the appended claims.

What is claimed is:

1. A bracket for an electrical box mounting assembly, comprising:

a substantially U-shaped portion for receiving a brace and having first and second ends;

first and second flanges extending from said first and second ends of said substantially U-shaped portion, respectively;

first and second tabs extending from said first and second flanges, respectively, each of said first and second tabs adapted to engage a first opening in an electrical box; and a fastener hole in each of said first and second flanges corresponding to a second opening in the electrical box for receiving fasteners to secure the electrical box to said bracket.

2. The bracket of claim 1, wherein:

said bracket is made of steel.

3. The bracket of claim 1, wherein:

said bracket comprises a one-piece, unitarily formed member.

4. The bracket of claim 1, wherein:

each of said first and second tabs has a chamfered end to facilitate engagement of said tabs with the first openings in the electrical box.

5. The bracket of claim 4, wherein:

each of said chamfered ends has about a 30 degree chamfer.

6. A bracket for an electrical box mounting assembly, comprising:

a substantially U-shaped portion adapted to receive a brace, said U-shaped portion having an inner surface and an outer surface, first and second legs, and first and second ends;

a protrusion on said inner surface of each of said first and second legs of said substantially U-shaped portion for retaining the brace within said bracket;

first and second flanges extending from said first and second ends of said substantially U-shaped portion, respectively; and a fastener hole in each of said first and second flanges corresponding to an opening in an electrical box for receiving fasteners to secure said bracket to the electrical box with the brace retained therebetween.

7. The bracket of claim 6, wherein:

said protrusions are dimples.

8. The bracket of claim 6, wherein:

said bracket is made of steel.

9. The bracket of claim 6, wherein:

said bracket comprises a one-piece, unitarily formed member.

10. An electrical fixture mounting assembly, comprising:

an electrical box having an upper wall, said wall having a plurality of openings therein;

a brace;

a bracket for attaching said electrical box to said brace, said bracket, including a substantially U-shaped portion adapted to receive said brace, said substantially U-shaped portion having an inner and an outer surface and first and second legs;

a protrusion on said inner surface of each of said first and second legs of said substantially U-shaped portion for retaining said brace within said bracket;

first and second flanges extending from said first and second legs, respectively, each of said flanges having a fastener hole therein corresponding to one of said plurality of openings in said electrical box upper wall;

first and second tabs extending from said first and second flanges, respectively, each of said first and second tabs adapted to engage one of said plurality of openings in said electrical box upper wall to align said box and said bracket; and fasteners extending through said plurality of openings in said electrical box into said flange fastener holes to secure said electrical box to said bracket with said brace secured therebetween.

11. The mounting assembly of claim 10, wherein:

said protrusions are dimples.

12. The mounting assembly of claim 10, wherein:

said bracket is made of steel.

13. The mounting assembly of claim 10, wherein:

said bracket is a one-piece, unitarily formed member.

14. The mounting assembly of claim 10, wherein:

said brace is substantially tubular.

15. The mounting assembly of claim 10, wherein:

each of said first and second tabs have a chamfered end to facilitate engagement of said tabs with said plurality of openings in said electrical box.

16. The mounting assembly of claim 15, wherein:

each of said chamfered ends has about a 30 degree chamfer.

17. The mounting assembly of claim 10, wherein said first and second flange fastener holes are threaded.

18. A method of mounting an electrical box to a brace, comprising the steps of inserting an adjustable brace having first and second ends through an opening in a ceiling between first and second joists;

adjusting the brace until the first and second brace ends contact the first and second joists creating a tight fit between the brace and the joists;

inserting a bracket through the ceiling opening;

snap-fitting the bracket onto the brace;

retaining the bracket on the brace with protrusions on the bracket that prevent substantial movement of the bracket on the brace during installation;

inserting an electrical box through the ceiling opening;

aligning and engaging the electrical box with the bracket; and inserting fasteners through electrical box fastener holes and through corresponding bracket fastener holes to secure the electrical box to the brace.

19. The method of claim 18, wherein the aligning and engaging step comprises orienting the box such that first and second bracket tabs engage electrical box openings to facilitate aligning and engaging the electrical box with the bracket.

20. A method of mounting an electrical box to a brace, comprising the steps of inserting an adjustable brace having first and second ends through an opening in a ceiling between first and second joists;

adjusting the brace until the first and second brace ends contact the first and second joists creating a tight fit between the brace and the joists;

inserting a bracket through the ceiling opening;

snap-fitting the bracket onto the brace;

retaining the bracket on the brace with protrusions on the bracket that prevent substantial movement of the bracket on the brace during installation;

inserting an electrical box through the ceiling opening;

aligning the electrical box with the bracket by engaging tabs on the bracket with openings in the electrical box; and inserting fasteners upwardly through electrical box fastener holes and through corresponding bracket fastener holes to secure the electrical box to the brace after said aligning and engaging step.

* * * * *